US012806451B2

(12) United States Patent
Hollis et al.

(10) Patent No.: US 12,806,451 B2
(45) Date of Patent: Nov. 24, 2026

(54) SECOND STAGE REGULATOR FOR EMERGENCY BREATHING SYSTEMS

(71) Applicant: ProAsia Design Co., Ltd., New Taipei City (TW)

(72) Inventors: Michael Hollis, Alameda, CA (US); Michael Gunning, Battleground, WA (US)

(73) Assignee: ProAsia Design Co., Ltd., New Taipei City (TW)

( * ) Notice: Subject to any disclaimer, the term of this patent is extended or adjusted under 35 U.S.C. 154(b) by 1232 days.

(21) Appl. No.: 17/665,268

(22) Filed: Feb. 4, 2022

(65) Prior Publication Data

US 2022/0266067 A1 Aug. 25, 2022

Related U.S. Application Data

(60) Provisional application No. 63/151,090, filed on Feb. 19, 2021.

(51) Int. Cl.

| | |
|---|---|
| ***A62B 9/02*** | (2006.01) |
| ***A62B 9/04*** | (2006.01) |
| ***A62B 9/06*** | (2006.01) |

(52) U.S. Cl.

CPC ................ *A62B 9/022* (2013.01); *A62B 9/04* (2013.01); *A62B 9/06* (2013.01)

(58) Field of Classification Search

CPC ........... A62B 7/14; A62B 9/022; A62B 9/025; A62B 9/04; A62B 9/06; B63C 11/186; B63C 11/2227

See application file for complete search history.

(56) References Cited

U.S. PATENT DOCUMENTS

| | | | | |
|---|---|---|---|---|
| 4,062,356 A * | 12/1977 | Merrifield | A62B 7/04 137/259 |
| 4,090,511 A * | 5/1978 | Gray | A62B 9/06 128/207.14 |

(Continued)

FOREIGN PATENT DOCUMENTS

| | | | |
|---|---|---|---|
| EP | 1134159 A1 | 9/2001 |
| EP | 4046690 A1 | 8/2022 |
| GB | 2291807 A | 2/1996 |

(Continued)

OTHER PUBLICATIONS

Capewell Aerial Systems LLC, Anatomy of the Category A Compressed Air Emergency Breathing System Passenger Short Term Air Supply System (PSTASS) CA-EBS, Meadows of Dan, VA, 1 Page.

(Continued)

*Primary Examiner* — Timothy A Stanis
*Assistant Examiner* — Matthew D Ziegler
(74) *Attorney, Agent, or Firm* — KPPB LLP

(57) ABSTRACT

Emergency breathing systems (EBS) allow users to breath underwater. Nosepieces hold the user's nose closed to facilitate use. Integrated nosepieces that ensure easy, single-handed operability provide improved reliability and operability. In an embodiment, a second stage regulator includes a housing, a first nosepiece coupled to a first lever, a second nosepiece coupled to a second lever, a first spring located in the housing and coupled to the first nosepiece and the first lever, a second spring located in the housing and coupled to the second nosepiece and the second lever, a mouthpiece, and a coupler coupled to the housing, wherein the first spring and the second spring bias the first nosepiece and the second nosepiece towards each other.

21 Claims, 12 Drawing Sheets

(56) References Cited

U.S. PATENT DOCUMENTS

| | | | | |
|---|---|---|---|---|
| 5,186,165 | A | 2/1993 | Swann | |
| 5,213,095 | A * | 5/1993 | Dague | F16L 27/02 128/205.24 |
| 5,394,867 | A | 3/1995 | Swann | |
| 5,503,140 | A * | 4/1996 | Winefordner | A62B 9/022 128/204.26 |
| 5,524,616 | A | 6/1996 | Smith et al. | |
| 5,720,279 | A * | 2/1998 | Furuichi | B63C 11/186 128/201.27 |
| 5,825,453 | A * | 10/1998 | Baragar | G02C 5/124 351/137 |
| 6,340,024 | B1 | 1/2002 | Brookman et al. | |
| 6,758,212 | B2 | 7/2004 | Swann | |
| 2004/0035415 | A1 * | 2/2004 | Faligant | B63C 11/22 128/201.27 |
| 2010/0002482 | A1 | 1/2010 | Dhong et al. | |

FOREIGN PATENT DOCUMENTS

| | | | |
|---|---|---|---|
| WO | 9922988 | A1 | 5/1999 |
| WO | 2009149507 | A1 | 12/2009 |

OTHER PUBLICATIONS

Aqua Lung, Sea—4500, Survival Egress Air, Aqua Lung, Vista, CA, Apr. 7, 2015, 1 Page.

Survitec, Halo Protecting You—Your Most Valuable Asset, Your Inflight Guardian, Findon, Aberdeen, UK, 2 Pages.

Extended European Search Report; Jul. 18, 2022; pp. 1-8, EP Application No. 22157322.3.

"SEA-4500 Emergency Breathing System", Capewell Aerial Systems LLC, Apr. 14, 2015 1 pg.

"Survitec Halo Lifejacket—Q&A Document", survitec Jun. 8, 2020, 4 pgs.

* cited by examiner

SECOND STAGE REGULATOR FOR EMERGENCY BREATHING SYSTEMS

CROSS-REFERENCE TO RELATED APPLICATIONS

The instant application claims priority to U.S. Provisional Patent Application No. 63/151,090, entitled "Second Stage Regulator for Emergency Breathing Systems" and filed Feb. 19, 2021, the disclosure of which is hereby incorporated by reference in its entirety.

TECHNICAL FIELD

The present invention is generally related to breathing systems and more specifically emergency breathing systems.

BACKGROUND

When an aircraft crashes into a body of water, it typically inverts and sinks. In survivable crashes, a large percentage of occupants of the aircraft often perish due to an inability to escape the aircraft while underwater.

SUMMARY OF THE INVENTION

Systems and methods for emergency breathing systems in accordance with embodiments of the invention are disclosed. In an embodiment, a second stage regulator includes a housing, a first nosepiece coupled to a first lever, a second nosepiece coupled to a second lever, a first spring located in the housing and coupled to the first nosepiece and the first lever, a second spring located in the housing and coupled to the second nosepiece and the second lever, a mouthpiece, and a coupler coupled to the housing, wherein the first spring and the second spring bias the first nosepiece and the second nosepiece towards each other.

In still another additional embodiment of the invention, the first nosepiece and the second nosepiece include a removable nose pad.

In yet another additional embodiment of the invention, the coupler includes a threaded coupler.

In still yet another additional embodiment of the invention, the coupler includes a swivel coupler.

In still another embodiment of the invention, the coupler is coupled to a hose.

In yet another embodiment of the invention, the coupler is coupled to an air tank and a user can inhale a breathing mix stored in the air tank via a pathway formed the housing and the mouthpiece.

In still yet another embodiment of the invention, the housing further includes at least one exhaust port allowing exhaled air to leave the second stage regulator.

In still another additional embodiment of the invention, the housing further includes a check valve preventing exhaled air from entering a pathway allowing a user to inhale a breathing mix.

In yet another additional embodiment of the invention, the pathway includes a poppet chamber having a poppet.

In still yet another additional embodiment of the invention, the exhaust port is located in an exhaust cover coupled to the housing.

In still another embodiment of the invention, the first nosepiece and the first lever rotate about a circumference of the housing when an actuation force is applied to the first lever.

In yet another embodiment of the invention, the first nosepiece and the first lever are formed in a unitary component.

In still yet another embodiment of the invention, the housing includes a front cover coupled to the housing.

In still another additional embodiment of the invention, the front cover engages with a portion of the first nosepiece, the first lever, the second nosepiece, and the second lever to maintain the first nosepiece, the first lever, the second nosepiece, and the second lever in engagement with the housing.

In yet another additional embodiment of the invention, the first spring is located in a first spring seat formed in the housing and the second spring is located in a second spring seat in the housing.

Still another embodiment of the invention includes a an emergency breathing system including an air tank and a second stage regulator coupled to the air tank, the second stage regulator including a housing, a first nosepiece coupled to a first lever, a second nosepiece coupled to a second lever, a first spring located in the housing and coupled to the first nosepiece and the first lever, and a second spring located in the housing and coupled to the second nosepiece and the second lever, where the first spring and the second spring bias the first nosepiece and the second nosepiece towards each other.

In yet another additional embodiment of the invention, the emergency breathing system further includes a first stage regulator coupled to the air tank, wherein the second stage regulator is coupled to the first stage regulator.

In still another additional embodiment of the invention, the emergency breathing system further includes a hose coupled to the first stage regulator, wherein the hose is coupled to the second stage regulator.

In still yet another additional embodiment of the invention, the air tank is formed from a material selected from the group consisting of aluminum and a composite.

In still another embodiment of the invention, the air tank stores a breathing mix and has a working pressure of approximately 3000 PSI to 4500 PSI.

In yet another embodiment of the invention, the air tank includes a first threaded coupler, the first stage regulator includes a second threaded coupler, the hose includes a first swivel coupler, and the second stage regulator includes a second swivel coupler, the air tank is coupled to the first stage regulator by the first threaded coupler and the second threaded coupler, and the hose is coupled to the second stage regulator via the first swivel coupler and the second swivel coupler.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the claims.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION

Figure 1B:
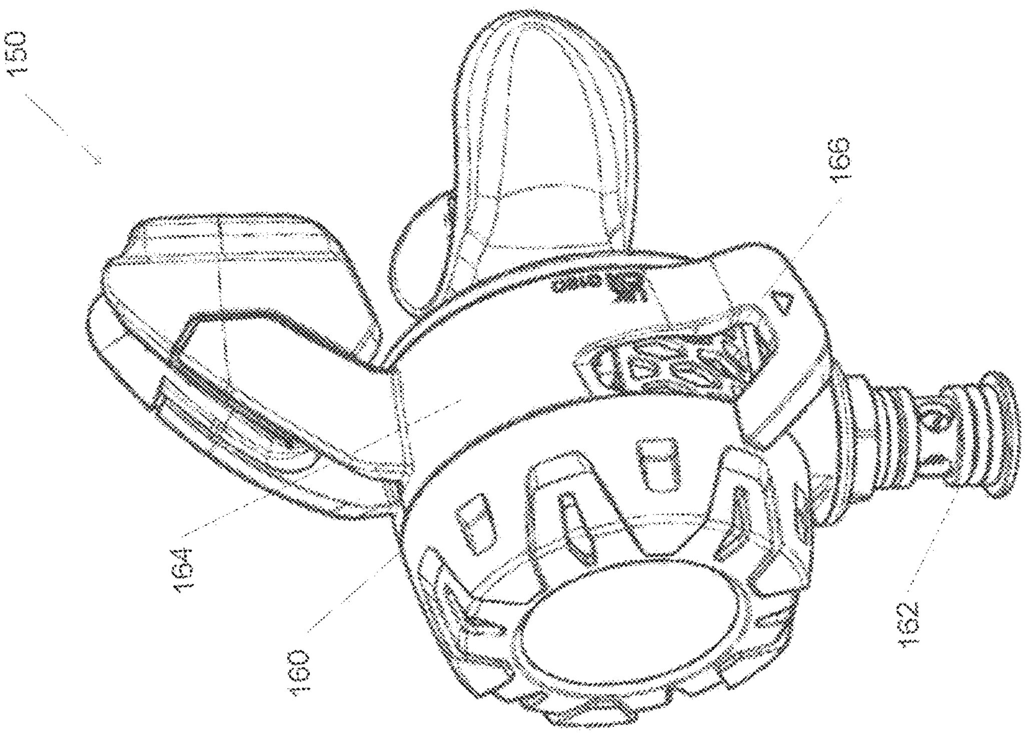
FIGS. 1A-B are line drawings of second stage regulators for emergency breathing systems in accordance with embodiments of the invention.

Turning now to the drawings, systems and methods for emergency breathing systems in accordance with embodiments of the invention are disclosed. Emergency Breathing Systems (EBS), whether a re-breather or compressed air unit, allow for users to breath while underwater. EBS are particularly useful in aircraft applications, allowing aircraft occupants to breathe underwater in the event of a crash into a body of water. This allows the occupants additional time to escape the aircraft, and the deployment of EBS can significantly reduce the number of deaths in survivable crashes in bodies of water.

Emergency breathing systems in accordance with embodiments of the invention can include a second stage regulator with integrated nosepieces. The nosepieces hold the user's nose closed to facilitate the use of the EBS while underwater. The nosepieces can be integrated into the body of the second stage regulator to improve reliability and ensure easy, single-handed operability in the event of a crash. Additionally, the second stage regulator can include one or more integrated exhaust covers. The integrated exhaust covers reduce the effort required to exhale while using the EBS. This reduced breathing effort can aid in usability and survivability when the user is breathing hard, such as due to stress during an underwater crash.

A variety of emergency breathing systems and second stage regulators in accordance with embodiments of the invention are described in more detail below.

Second Stage Regulators

Second stage regulators in accordance with embodiments of the invention can include integrated exhaust covers and/or nosepieces located on the left and right sides of the regulator body. The integrated exhaust covers can be formed into the body of the second stage regulator and/or in a back plate of the second stage regulator. The integrated exhaust covers can include one or more exhaust vents allowing exhaled air to be released from the second stage regulator when a user exhales. The integrated exhaust covers further protect any internal mechanisms, such as exhaust values, from becoming entangled or clogged by debris.

The nosepieces can engage with and cover the body of the second stage regulator. In a variety of embodiments, the nosepieces extend from a front end of the regulator body to a rear end of the regulator body. In several embodiments, the nosepieces extend from a rear end of a front cover ring attached to the front of the regulator body to a front end of a back plate attached to the rear of the regulator body. The nosepieces are located on the left and right sides of the second stage regulator and generally extend from the top side of the regulator body to the lower end of the exhaust vents. Each of the nosepieces can have a nose clip located at the top end of the nosepiece and a lever located at the lower end of the nosepiece. In particular, the levers of the nosepieces are located on the lower left and right sides of the body near a coupler located at the bottom of the second stage regulator, allowing for one-handed operation of the nosepieces. The nosepieces can have a generally solid body that protects the internal components of the second stage regulator. In particular, the nosepieces cover any internal springs or spring housings that engage with the nosepieces as described in more detail herein. In this way, the nosepieces form a housing cover for the regulator body, protecting the internal mechanisms and springs from the external environment. For example, particularly in underwater environments, a variety of debris can interfere with the operation of the nosepieces, such as by becoming entangled with springs that hold the nosepieces in a closed position. By covering these internal elements, the performance and reliability of the second stage regulator is improved. In many embodiments, the nosepieces include an exhaust opening, formed near the levers, which allow air to flow freely from the integrated exhaust covers while the second stage regulator is in use.

Figure 1A:
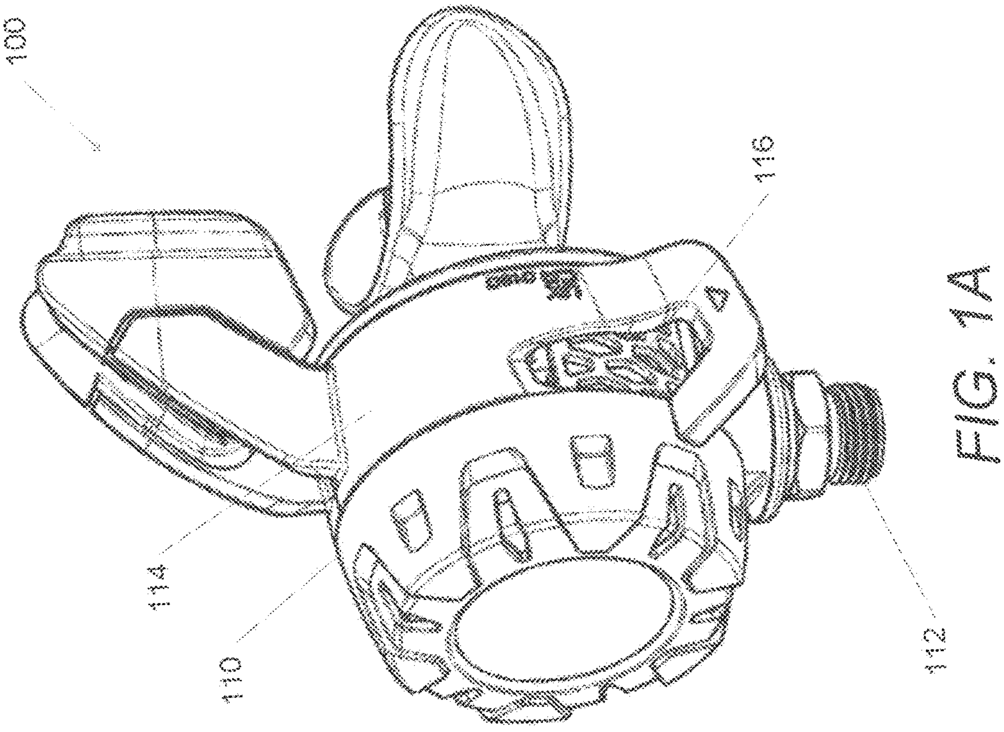

FIGS. 1A-B are line drawings of second stage regulators for emergency breathing systems in accordance with embodiments of the invention. FIG. 1A shows a second stage regulator 100 with a threaded coupler 112. In many embodiments, the threaded coupler 112 has screw threads that can be used to join the second stage regulator to an air tank, hose, or any other device. The threaded coupler 112 can have straight threads, taper threads, and/or any other configuration of threads as appropriate to a particular application of the invention. The threaded coupler 112 can be formed from steel, brass, PTFE, PVC, nylon, bronze, iron, and/or any other material as appropriate. Second stage regulator 100 further includes integrated exhaust covers 116 and nosepieces 114. The nosepieces 114 include levers located near the threaded coupler 112, allowing for one-handed operation of second stage regulator 100. Nosepieces 114 form a housing cover for the body of the second stage regulator 100. Nosepieces 114 have an opening formed near the levers and positioned relative to the exhaust covers 116, allowing for the free flow of exhaled air during operation of the second stage regulator 100.

FIG. 1B shows a second stage regulator 150 with a swivel fitting 162. In several embodiments, swivel fitting 162 allow for a hose (or anything coupled to the swivel fitting) to swivel with respect to the fitting. In many embodiments, swivel fitting 162 includes a perforated hollow bolt and cylindrical union allowing for fluid transfer from a hose or air tank through the second stage regulator 150. Second stage regulator 150 further includes integrated exhaust covers 166 and nosepieces 164. The nosepieces 164 include levers located near the swivel coupler 162, allowing for one-handed operation of second stage regulator 150. Nosepieces 164 form a housing cover for the body of the second stage regulator 150. Nosepieces 164 have an opening formed near the levers and positioned relative to the exhaust covers 166, allowing for the free flow of exhaled air during operation of the second stage regulator 150.

Although a variety of second stage regulators are shown and described with respect to FIGS. 1A-B, any of a variety of other second stage regulators, including those that use couplers other than those illustrated, can be used in accordance with embodiments of the invention.

Figure 2B:
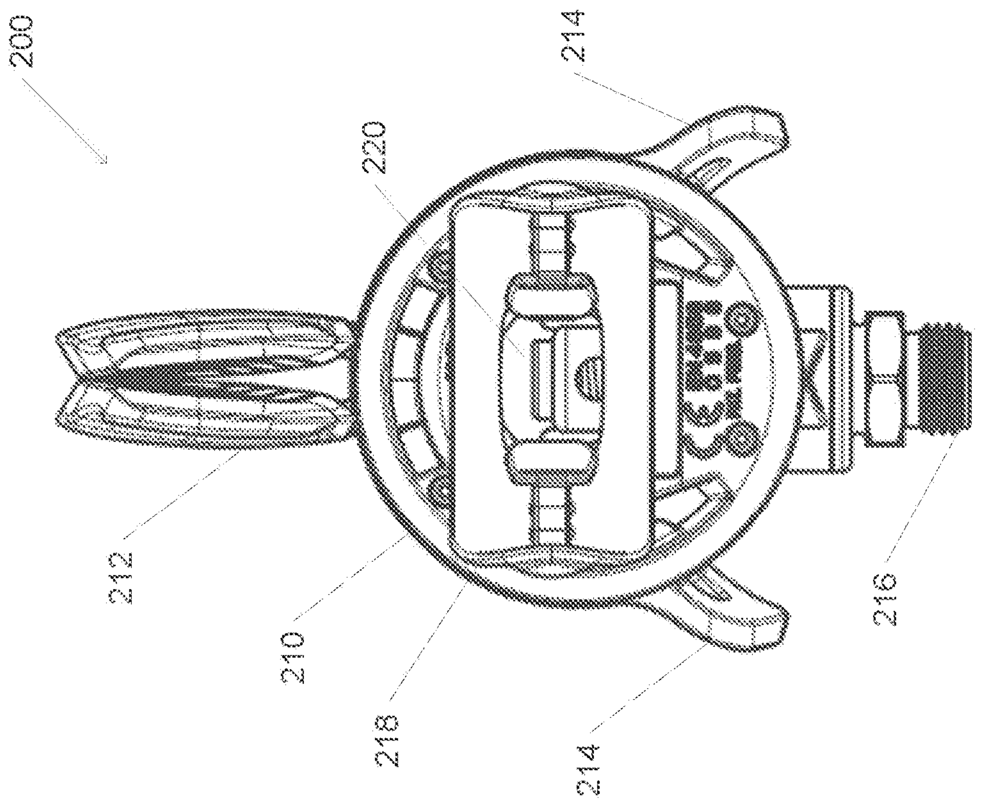
FIGS. 2A-C are perspective drawings of second stage regulators in accordance with embodiments of the invention.
Figure 2A:
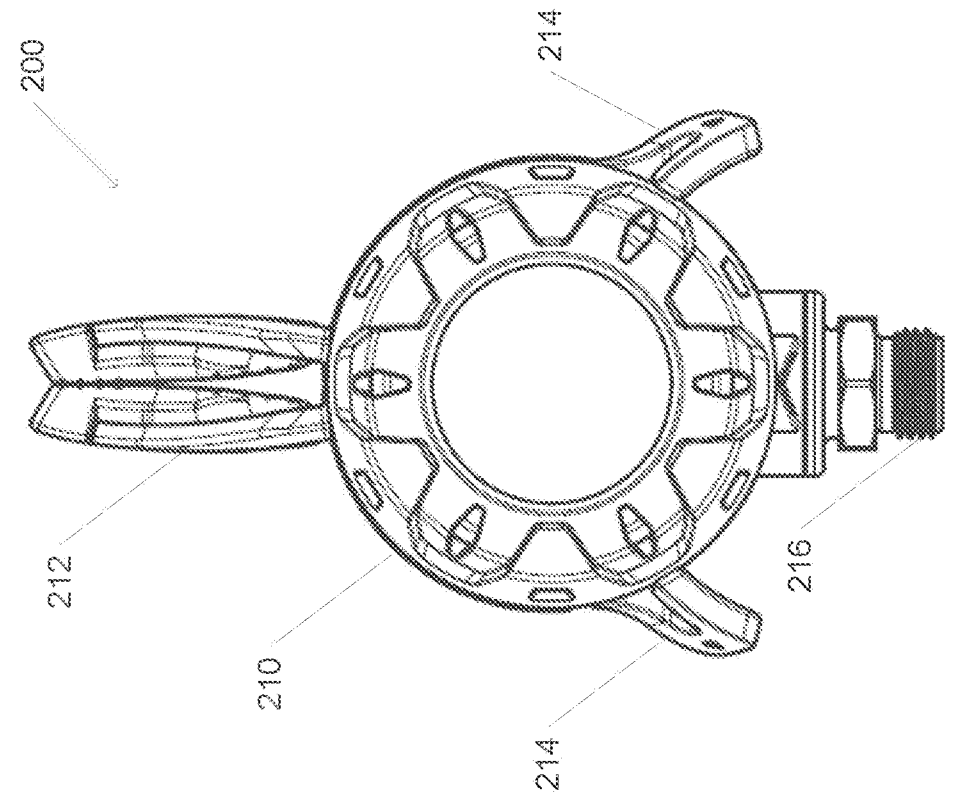
Figure 2C:
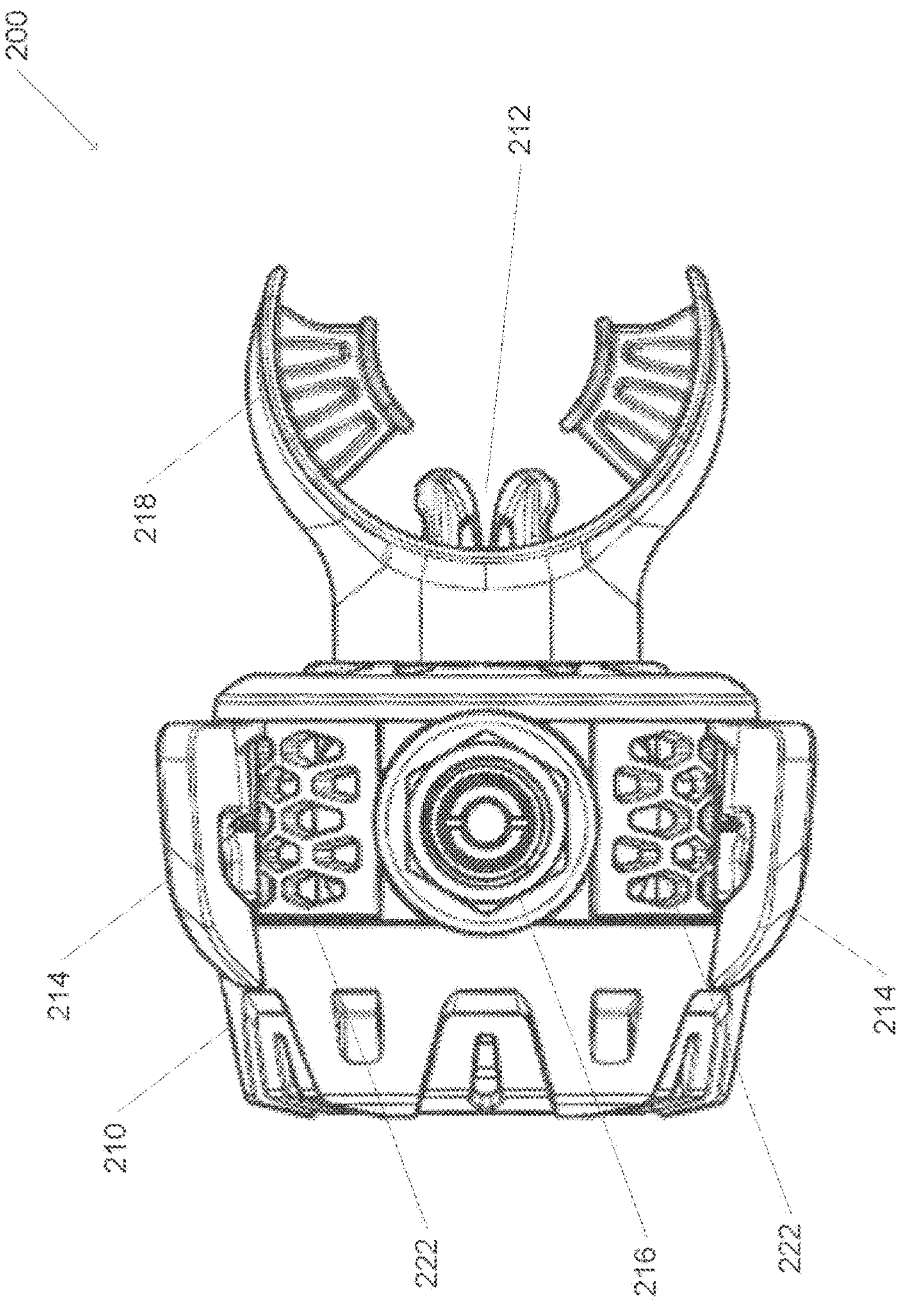

FIGS. 2A-C are perspective drawings of second stage regulators in accordance with embodiments of the invention. FIG. 2A shows a front view of a second stage regulator 200, FIG. 2B shows a rear view of the second stage regulator 200, and FIG. 2C shows an underside view of the second stage regulator 200.

Second stage regulator 200 includes a housing 210 having nosepieces 212 and levers 214 coupled to the housing 210. Levers 214, when depressed, rotate about the circumference of the housing 210 and cause nosepieces 212 to open so that a user can insert their nose between the nosepieces 212. Mouthpiece 218 can be placed in the user's mouth, thereby allowing the user to inhale a breathing mix via opening 220. When the levers 214 are released, a spring returns the levers 214 to their original position, thereby causing nosepieces 212 to close. Second stage regulator 200 further includes a coupler 216, such as a threaded coupler and/or a swivel fitting as described herein. Exhaust vents 222 allow exhaled air to be released from the second stage regulator 200 when a user exhales.

In a variety of embodiments, a lever 214 and its corresponding nosepiece 212 are a unitary component. In several embodiments, a lever 214 and its corresponding nosepiece 212 are coupled via a linkage or other coupling element. The exhaust vents 222 can be formed into the housing 210 and/or formed into a separate component that couples with the housing 210. The mouthpiece 218 can be formed into the housing 210 and/or be separate component that couples with the housing 210

Although a variety of components for second stage regulators are shown and described with respect to FIGS. 2A-C, any of a variety of other components can be included in a second stage regulator in accordance with embodiments of the invention.

Figure 3B:
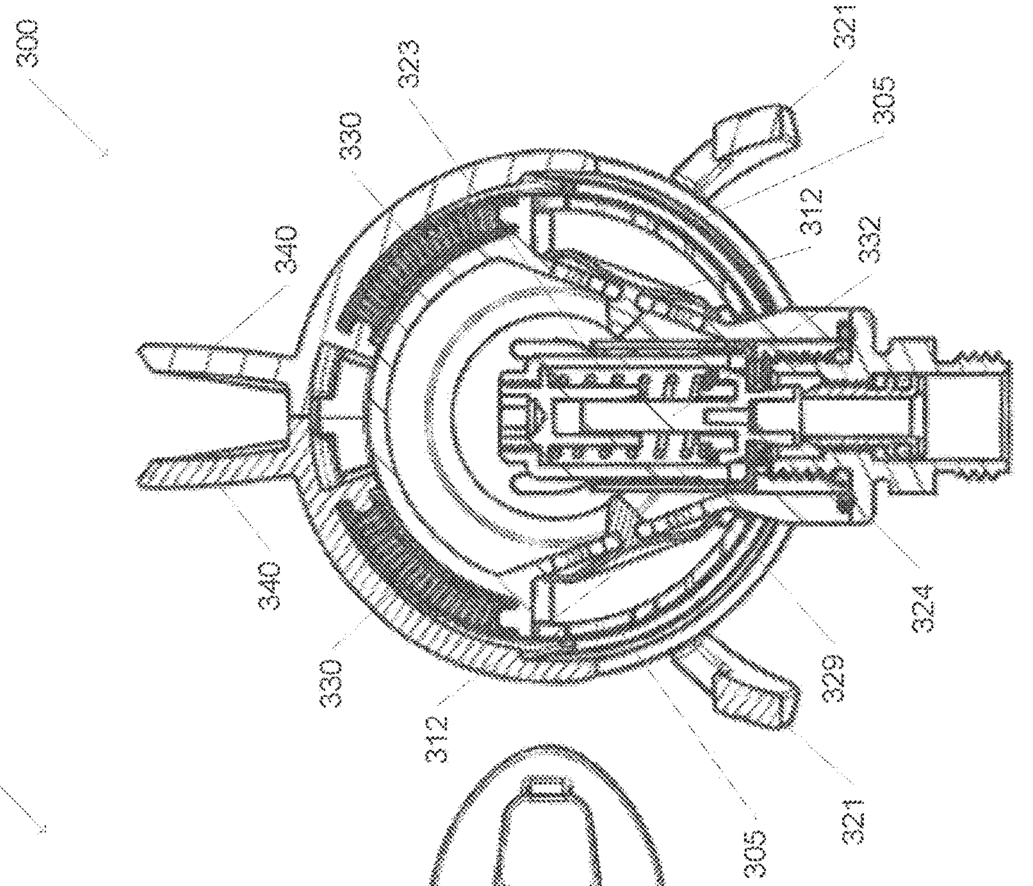
FIG. 3A-C are line drawings illustrating a cross section of second stage regulators in accordance with embodiments of the invention.
Figure 3A:
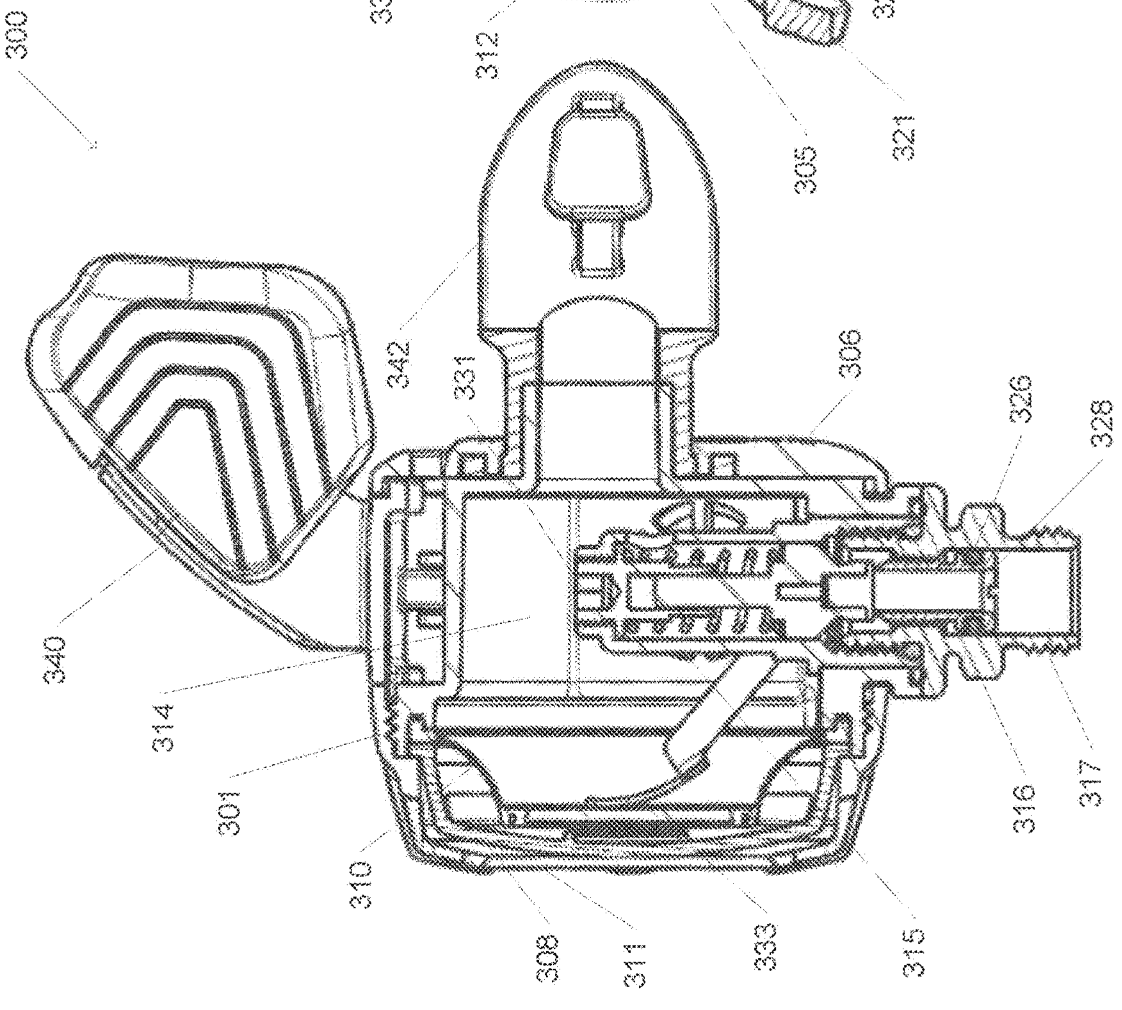
Figure 3C:
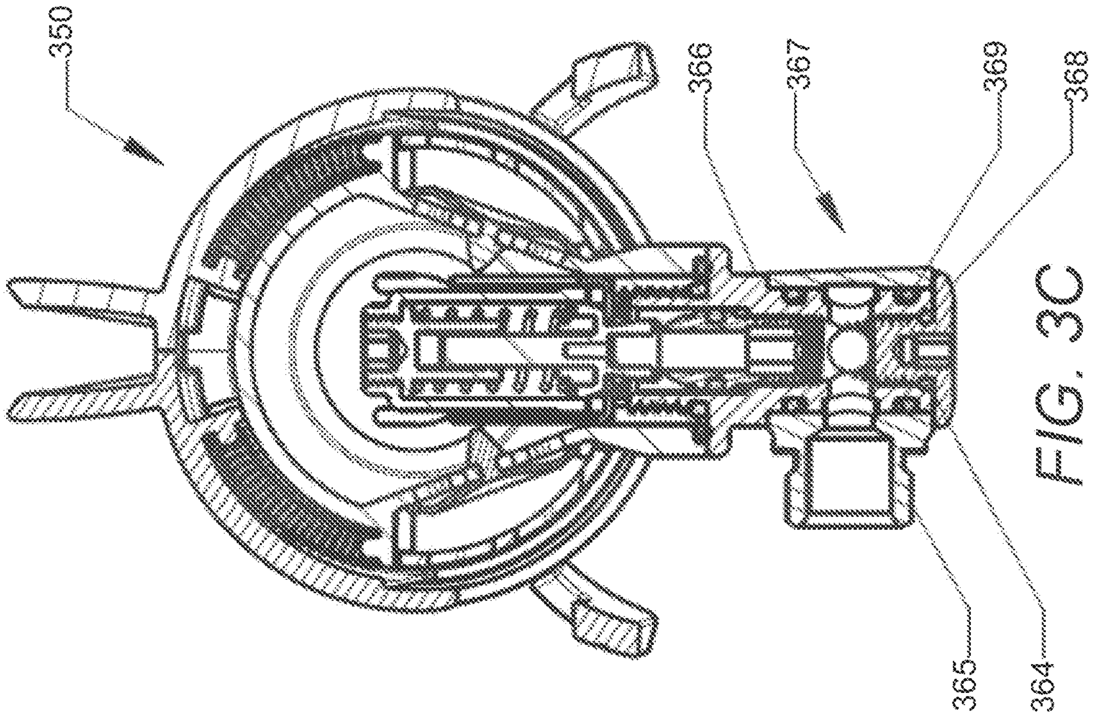

FIG. 3A-C are line drawings illustrating cross-sections of second stage regulators in accordance with embodiments of the invention. FIG. 3A shows a cross-section of a second stage regulator 300 with the front of the second stage regulator on the left hand side of the drawing and the mouthpiece on the right hand side of the drawing, the top of the nosepiece on the top of the drawing, and a coupler on the bottom of the drawing. FIG. 3B shows a second cross-section of the second stage regulator 300 with the left hand side of the second stage regulator on the left hand side of the drawing and the right hand side of the second stage regulator 300 on the right hand side of the drawing. Second stage regulator 300 includes a housing 301, a nose clip 340, exhaust vents 305, a back plate 306, a mouthpiece 342, a purge cover 308, a lever 333, a diaphragm assembly 310, a front cover 311, exhaust valves 312, an inlet chamber 314, a valve housing 315, a coupler 316 having threads 317, a poppet chamber 323 levers 321, and/or one or more springs 330.

When in use, a user actuates levers 321 to rotate nosepieces 340 into an open position. With the nosepieces 340 in an open position, the user can place the mouthpiece 342 in their mouth and release the levers 321. The springs 330, coupled to the nosepieces 340 and/or levers 321, push the nosepieces 340 and/or levers 321 into the closed position, clamping the user's nose closed with the nosepieces 340. In many embodiments, the springs 330 are contained within spring housings formed on the housing 301. The nosepieces 340 and levers 321 can rotate about the circumference of the housing 301. In a number of embodiments, the front cover 311 engages with a tab or groove on the nosepieces 340 and/or levers 321 to hold the nosepieces 340 and/or levers 321 in engagement with the housing 301. A nosepiece and its corresponding lever can be formed as a unitary piece and/or be separate pieces coupled (e.g. via one or more linkages) as appropriate to the requirements of specific applications of embodiments of the invention. In many embodiments, the second stage regulator 300 includes a unitary left nosepiece and lever coupled to the left hand side of the second stage regulator 300 and a unitary right nosepiece and lever coupled to the right hand side of the second stage regulator 300.

In a variety of embodiments, the coupler 316 is removably engaged with the housing 301. The orifice seat 328 is adjustably engaged with the coupler 316 and sealed with O-ring 326. In many embodiments, a valve housing 315 is installed in the inlet chamber 314. The valve housing 315 can have a poppet chamber 323 having a poppet spring 329, a poppet 332, a poppet seat 324, and an adjustment tube 331. The poppet seat 324 engages with orifice seat 328 in order to control the flow of air through a pathway formed by coupler 316, the poppet chamber 323, inlet chamber 314, and mouthpiece 342. The poppet spring 329 biases the poppet 332 into a closed position. The rate (e.g. force) of the spring 329 can be determined based on the target pressure for a breathing mix to be inhaled via the second stage regulator 300. The rate of the spring 329 can be adjusted with the adjustment tube 331. The lever 333 engages the valve housing 315 and the poppet 332, such that movement of the lever 333 moves the poppet 332. In this way, the spring 329 is compressed when a gas mix is being inhaled through the pathway, thereby moving the poppet 332 up to disengage with the orifice seat 328 and allowing the flow of air. When not inhaling, the poppet spring 329 forces the poppet 332 back into the closed position, preventing the flow of air. When a pressurized gas is provided at coupler 316 and/or when a user inhales, the poppet 332 moves up allowing air flow in the poppet chamber 323, exhaust valves 312 are closed, and air can flow through the pathway to be inhaled by the user.

One or more exhaust vents 305 can be formed in a back cover 306. The back plate 306 can be coupled to the housing 301. Any fastener and/or direct connection between the back plate and the 306 can be used in accordance with the requirements of specific applications of embodiments of the invention. When the user exhales, the pressure of the exhaled gas moves the diaphragm assembly 310 allowing the lever 333 to move the poppet 332 to the closed position, preventing the exhaled gas from flowing through poppet chamber 323. When the user exhales, airflow in the poppet chamber 323 is closed, exhaust valves 312 are opened, and the exhaled gas can pass through a pathway formed by the mouthpiece 342, the inlet chamber 314, and the exhaust vents 305 to exit the second stage regulator 300.

When a user breathes using the second stage regulator 300, water, spit, and other contaminants can build up inside the second stage regulator 300. The purge cover 308 can be located within front cover 311 and accessed via an opening in the front cover 311. The purge cover 308 can be actuated to flush these contaminants from the second stage regulator 300. The purge cover 308 engages with diaphragm assembly 310, which engages with lever 333. When actuating the purge cover 308, the lever 333 is depressed, moving the poppet 332 up, thereby allowing the pressurized breathing mix to flow through the poppet chamber 323 and allowing any air and/or contaminants to be ejected from the interior of the second stage regulator 300. In many embodiments, purging the second stage regulator 300 requires the user to exhale while the purge cover 308 is depressed. In a variety of embodiments, depressing the purge cover 308 causes air flow in the poppet chamber 323, causing pressurized breathing mix to enter the balancing chamber 314 and flow out of the front cover 311 of the second stage regulator 300.

As described herein, second stage regulators can include a variety of couplers. These couplers can be removably attached to the second stage regulator. FIG. 3C shows a cross-section of a second stage regulator 350 having a swivel coupler 367. The swivel coupler 367 includes a swivel coupling 365, swivel retainer 368, O-ring 364, O-ring 369, and swivel housing 366. In a variety of embodiments, the swivel housing 366 can be rotated relative to the second stage regulator 350, thereby allowing objects coupled to the swivel coupling 365, such as a hose or an air tank, to rotate with respect to the second stage regulator 350.

Although a variety of second stage regulators are shown and described with respect to FIGS. 3A-C, any of a variety of other second stage regulators can be used in accordance with embodiments of the invention.

Figure 4:
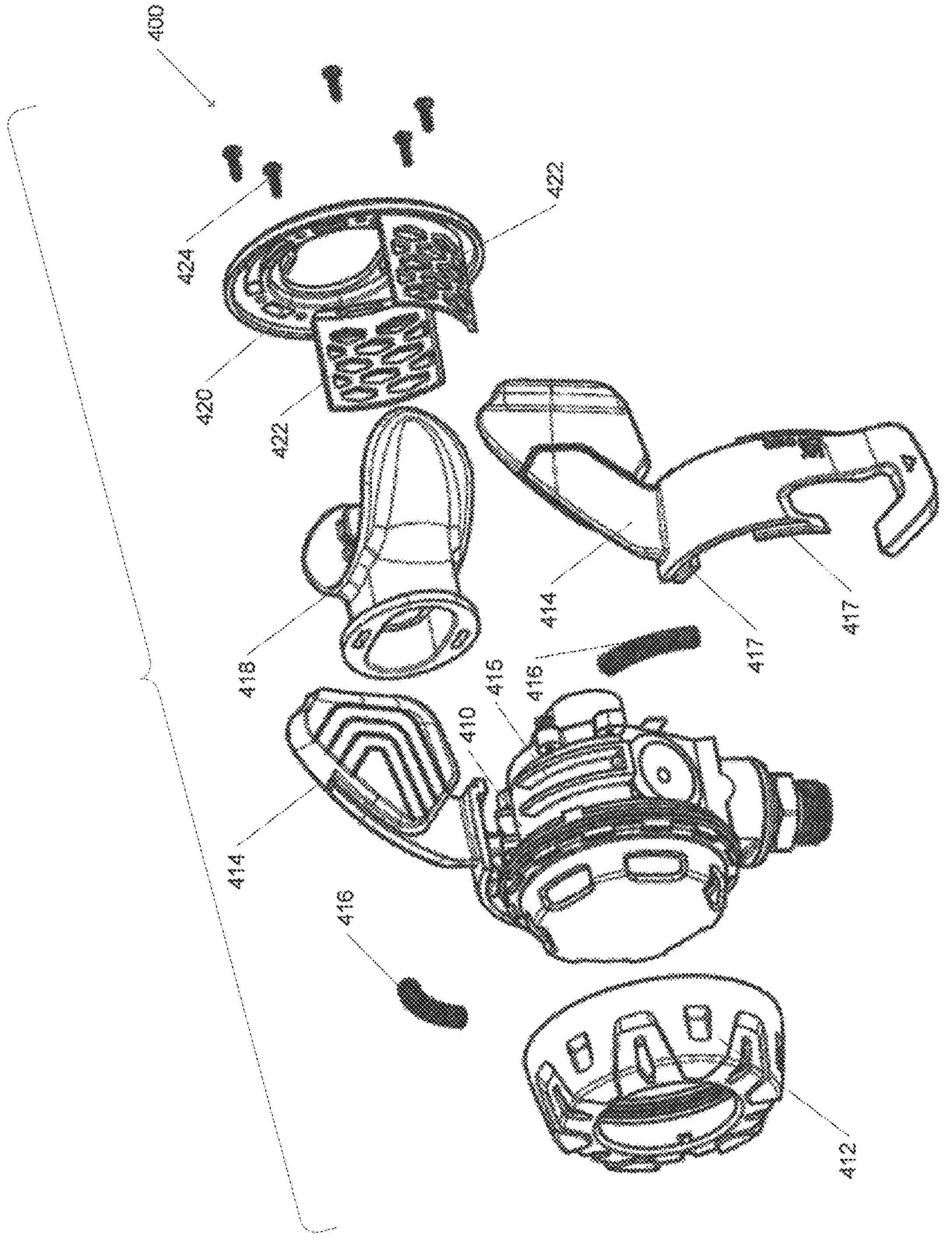
FIG. 4 is an illustration of the components of a second stage regulator in accordance with an embodiment of the invention.

FIG. 4 is an illustration of the components of a second stage regulator in accordance with an embodiment of the invention. Second stage regulator 400 includes a regulator body 410 that accepts a front cover 412. Regulator body 410 includes spring housings 415 that accept springs 416. Springs 416 further couple to posts, grooves, and/or slots in the nosepiece components 414 such that, when nosepiece components 414 are coupled to the regulator body 410, the nosepiece components 414 can be moved between an open position and a closed position by the springs 416. In the open position, a user's nose can be located between the nose pads of nosepiece components 414, while in the closed position the tension created by the springs 416 cause the nose pads coupled to nosepiece components 414 to hold the user's nose closed. The regulator body further includes a coupler capable of accepting a mouthpiece 418, which allows the user to breathe through the second stage regulator. The regulator body 410 is also shaped to accept a rear cover 420 having integrated exhaust vents 422. In many embodiments, the rear cover 420 can fit over the mouthpiece 418 secure the mouthpiece 418 to the regulator body 410. The rear cover 420 can be secured to the regulator body 410 via screws 424, although any attachment elements, such as clips, pins, threads, and the like can be used as appropriate.

The nosepiece components 414 can be coupled to the regulator body via the front cover 412 and/or rear cover 420. In a variety of embodiments, the front cover 412 and/or rear cover 420, when coupled to the regulator body 410, define one or more grooves in which one or more portions (e.g. tabs 417) of the nosepiece components 414 engage and allow the nosepiece components 414 to move around the regulator body 410. However, it should be noted that other arrangements, such as those where the regulator body 410 defines the grooves in which the nosepiece components 414 can move and those where the nosepiece components 414 define a groove which accepts a tab extending from the regulator body 410, front cover 412 and/or rear cover 420, can be used as appropriate to the requirements of specific applications of embodiments of the invention.

Although a variety of components of second stage regulators are shown and described with respect to FIG. 4, any of a variety of other second stage regulators can be used in accordance with embodiments of the invention.

Figure 5A:
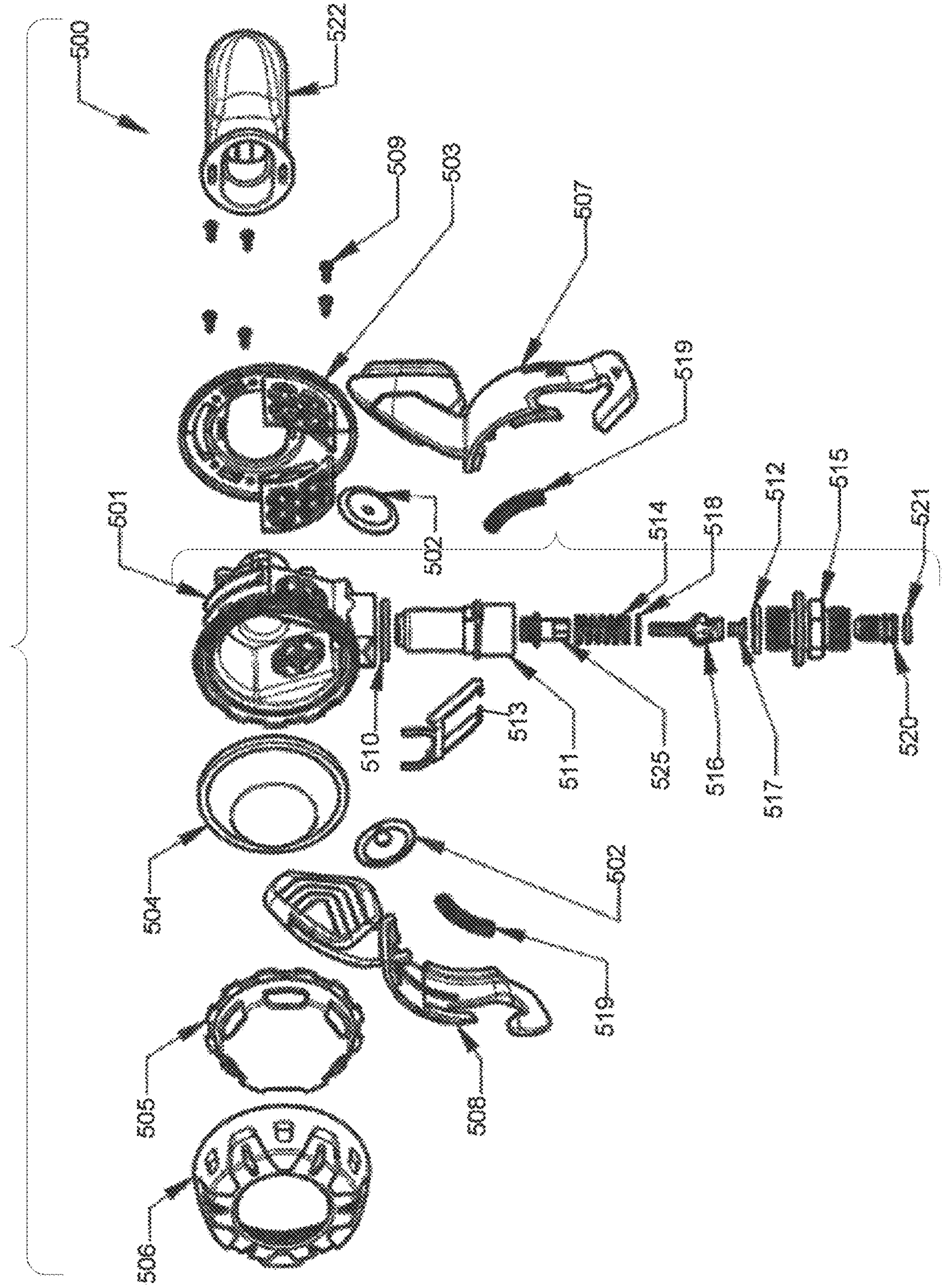
FIG. 5A-C are illustrations of the components of a second stage regulator in accordance with embodiments of the invention.
Figure 5B:
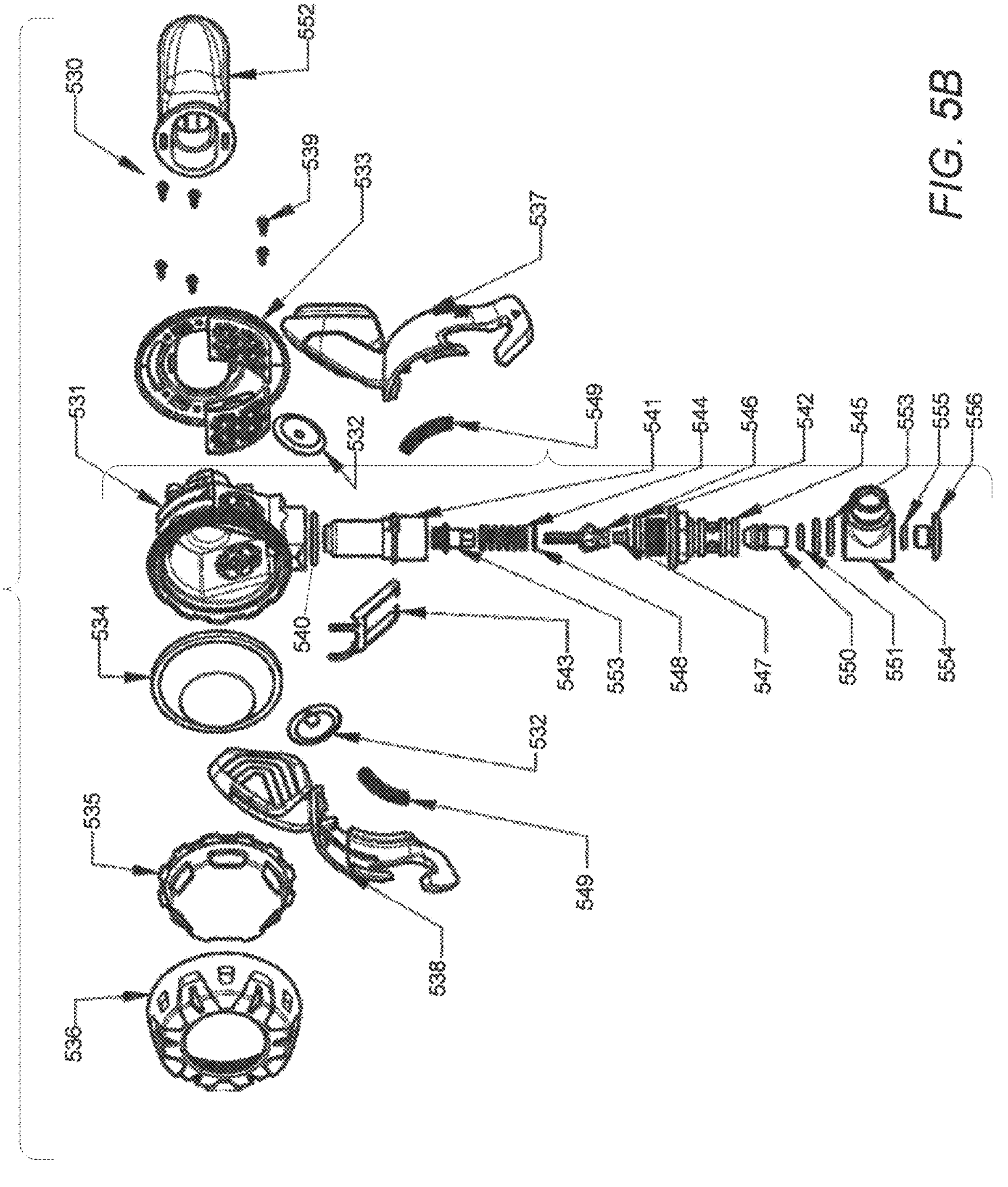
Figure 5C:
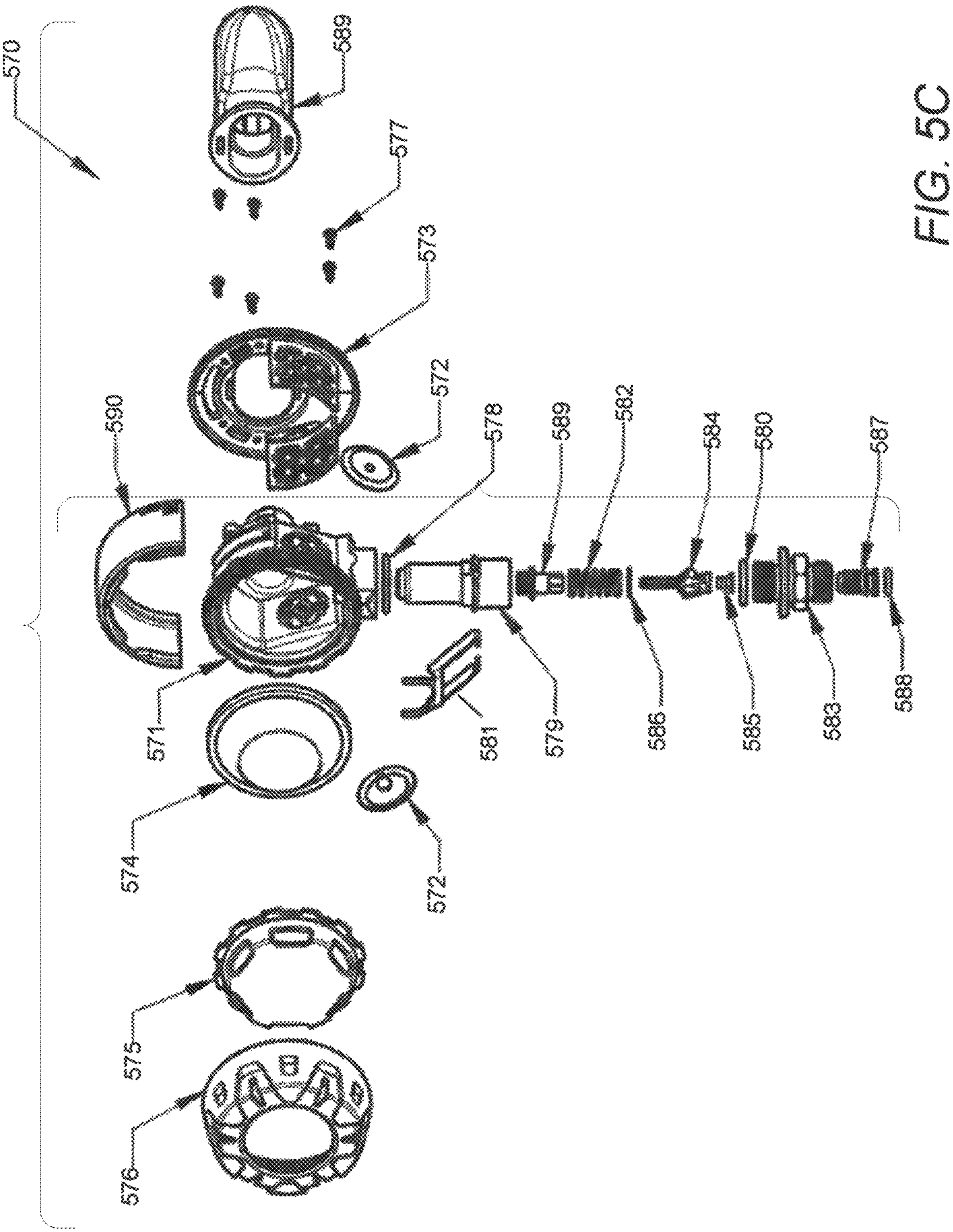

FIG. 5A-C are illustrations of the components of a second stage regulator in accordance with embodiments of the invention. FIG. 5A shows the components of a first construction of a second stage regulator 500. The second stage regulator 500 includes a regulator body 501, exhaust valves 502, a back plate 503, a diaphragm 504, a purge cover 505, front cover ring 506, a left nose clip 507, a right nose clip 508, screws 509, O-ring 510, valve housing 511, O-ring 512, adjustment tube 525, lever 513, poppet spring 514, coupler 515, poppet 516, poppet seat 517, washer 518, nose clip springs 519, orifice seat 520, O-ring 521, and mouthpiece 522. Second stage regulator 500 is assembled as follows. The front portion of regulator body 501 includes threads allowing front cover ring 506 to be screwed onto regulator body 501. Diaphragm 510 is placed in regulator body 501. Purge cover 505 is placed on top of diaphragm 510 and front cover ring 506 is screwed onto regulator body 501. Mouthpiece 522 can be placed on an opening on the rear side of the regulator body 501. Exhaust valves 502 can be coupled to exhaust ports on the left and right hand sides of the regulator body 501. Back plate 503 can be placed over the rear of regulator body 501, covering the exhaust valves 502 and securing the mouthpiece 522 to the regulator body 501. Back plate 503 can be secured to the regulator body 501 using any of a variety of fasteners or clips, such as screws 509. Nose clip springs 519 can be places in spring housings located on the left and right hand sides of the regulator body 501. Left nose clip 507 can be coupled to the left hand side of the regulator body 501 and right nose clip 508 can be coupled to the right hand side of the regulator body 501. The left nose clip 507 and the right nose clip 508 can couple directly to the regulator body 501 and/or be secured to the regulator body 501 by front cover ring 506 and/or back plate 503. On the bottom of the regulator body 501, valve housing 511 can be installed (e.g. by screwing, press fit, or any other attachment) and sealed using O-ring 510. Orifice seat 520 and O-ring 521 can be assembled in coupler 515. A poppet assembly can be inserted into valve housing 511. The poppet assembly includes adjustment tube 525, a poppet spring 514, a poppet 516 placed within poppet spring 514, a washer 518 placed on the top end of poppet 516, a poppet seat 517 placed on the lower end of poppet 516, and lever 513 inserted in valve housing 511 holding the poppet 516. Coupler 515 can be screwed, press fit, or otherwise coupled to valve housing 511 and sealed using O-ring 512. The coupler 515 can have a variety of attachment components, such as threads, to attach hoses or any other external devices to the second stage regulator 500. The spring 514 can engage with the adjustment tube 525 and adjusting adjustment tube 525 can modify the rate, compression, and/or force of spring 514.

FIG. 5B shows the components of a second construction of a second stage regulator 530. Second stage regulator 530 includes housing 531, exhaust valve 532, back plate 533, diaphragm 534, purge cover 535, front cover ring 536, left nose clip 537, right nose clip 538, screws 539, O-ring 540, valve housing 541, O-ring 542, lever 543, poppet spring 544, coupler 545, poppet 546, poppet seat 547, washer 548, nose clip springs 549, orifice seat 550, O-ring 551, mouthpiece 552, and adjustment tube 553. Second stage regulator 530 is assembled as follows. The front portion of regulator body 531 includes threads allowing front cover ring 536 to be screwed onto regulator body 531. Diaphragm 534 is placed in housing 531. Purge cover 535 is placed on top of diaphragm 534 and front cover ring 536 is screwed onto regulator body 531. Mouthpiece 552 can be placed on an opening on the rear side of the regulator body 531. Exhaust valves 532 can be coupled to exhaust ports on the left and right hand sides of the regulator body 531. Back plate 533 can be placed over the rear of regulator body 531, covering the exhaust valves 532 and securing the mouthpiece 552 to the regulator body 531. Back plate 533 can be secured to the regulator body 531 using any of a variety of fasteners or clips, such as screws 539. Nose clip springs 549 can be places in spring housings located on the left and right hand sides of the regulator body 531. Left nose clip 537 can be coupled to the left hand side of the regulator body 531 and right nose clip 538 can be coupled to the right hand side of the regulator body 538. The left nose clip 537 and the right nose clip 538 can couple directly to the regulator body 531 and/or be secured to the regulator body 531 by front cover ring 536 and/or back plate 533. On the bottom of the regulator body 531, valve housing 541 can be installed (e.g. by screwing, press fit, or any other attachment) and sealed using O-ring 540. Orifice seat 550 and O-ring 551 can be assembled in swivel coupler 545. A poppet assembly can be inserted into valve housing 541. The poppet assembly includes an adjustment tube 553, a poppet spring 544 engaging with the adjustment tube 553, a poppet 546 placed within poppet spring 544, a washer 548 placed between the poppet 546 and the poppet spring 544, a poppet seat 547 placed on the lower end of poppet 546, a lever 543 inserted in valve housing 541 holding poppet 546, and swivel coupler 545 screwed (or otherwise coupled) to the valve housing 541 and sealed using O-ring 542. Orifice seat 550 is threaded within swivel coupler 545 and sealed by O-ring 551. The poppet spring 544 can be adjusting the adjustment tube 553 as described herein. The swivel coupler 545 includes a swivel coupling 551, swivel retainer 556, O-ring 553, O-ring 555. In a variety of embodiments, the swivel coupling 551 can be rotated relative to the second stage regulator 350, thereby allowing objects coupled to the swivel coupling 551, such as a hose or an air tank, to rotate with respect to the second stage regulator 530.

FIG. 5C shows the components of a second construction of a second stage regulator 570. The second stage regulator 570 includes a regulator body 571, exhaust valves 572, a back plate 573, a diaphragm 574, a purge cover 575, front cover ring 576, a housing cover 590, screws 577, O-ring 578, valve housing 579, O-ring 580, adjustment tube 589, lever 581, poppet spring 582, coupler 583, poppet 584, poppet seat 585, washer 586, orifice seat 587, washer 588, and mouthpiece 589. Second stage regulator 570 is assembled as follows. The front portion of regulator body 571 includes threads allowing front cover ring 576 to be screwed onto regulator body 571. Diaphragm 574 is placed in regulator body 571. Purge cover 575 is placed on top of diaphragm 574 and front cover ring 576 is screwed onto regulator body 576. Mouthpiece 589 can be placed on an opening on the rear side of the regulator body 571. Exhaust valves 572 can be coupled to exhaust ports on the left and right hand sides of the regulator body 571. Back plate 573 can be placed over the rear of regulator body 571, covering the exhaust valves 572 and securing the mouthpiece 589 to the regulator body 571. Back plate 573 can be secured to the regulator body 571 using any of a variety of fasteners or clips, such as screws 577. Housing cover 590 can be placed on top of regulator body 571, covering spring housings formed in the regulator body 571. The housing cover 590 can couple directly to the regulator body 571 and/or be secured to the regulator body 571 by front cover ring 576 and/or back plate 573. In several embodiments, the housing cover 590 can be installed on the regulator body 571 in place of any nosepieces and/or levers. The housing cover 590 can include tabs and/or grooves with engage with corresponding grooves/tabs in the back plate 573, purge cover 575, and/or front cover ring 576 of the second stage regulator 570. The housing cover 590 can be used to protect particular elements of the second stage regulator 570 and/or added as a styling piece in accordance with the requirements of specific applications of embodiments the invention.

On the bottom of the regulator body 571, valve housing 579 can be installed (e.g. by screwing, press fit, or any other attachment) and sealed using O-ring 578. A poppet assembly can be inserted into valve housing 579. The poppet assembly includes an adjustment tube 589, a poppet spring 582 placed around adjustment tube 589, a poppet 584 placed within poppet spring 582, a washer 586 placed on the top end of poppet 584, a poppet seat 585 placed on the lower end of poppet 584. Once assembled, the poppet assembly can be held within the valve housing 579 by lever 581. Coupler 583 can be screwed, press fit, or otherwise coupled to valve housing 579 and sealed using O-ring 580. Orifice seat 587 and O-ring 588 can be assembled in coupler 583. Adjusting adjustment tube 589 can modify the rate, compression, and/or force of spring 582 as described herein.

Although a variety of second stage regulators are shown and described with respect to FIGS. 5A-C, any of a variety of other second stage regulators including those with more or fewer components or components arranged in a different matter, can be used in accordance with embodiments of the invention.

A variety of second stage regulators in accordance with embodiments of the invention have nosepieces designed to hold a user's nose closed during operation, thereby improving the user's ability to breath a breathing mix via the second stage regulator. The nosepieces can include replaceable nose pads. In this way, new and/or clean nose pads can be inserted by a user prior to use. In many embodiments, the nose pads are shaped to be press fit into holes in the nosepieces. In a variety of embodiments, the nose pads are shaped to be slid over the ends of the nosepieces. It should be noted that non-replaceable nosepieces, such as those nose pads over molded onto the nosepieces, can also be used. Similarly, the mouthpiece of the second stage regulator can also be replaceable by the user. The nose pads and/or mouthpieces used in the second stage regulators can be formed out of any of a variety of materials or a combination of materials, such as silicone, rubber, foam, ethylene-vinyl acetate, vinyl, thermopolymers, and the like.

Figure 6B:
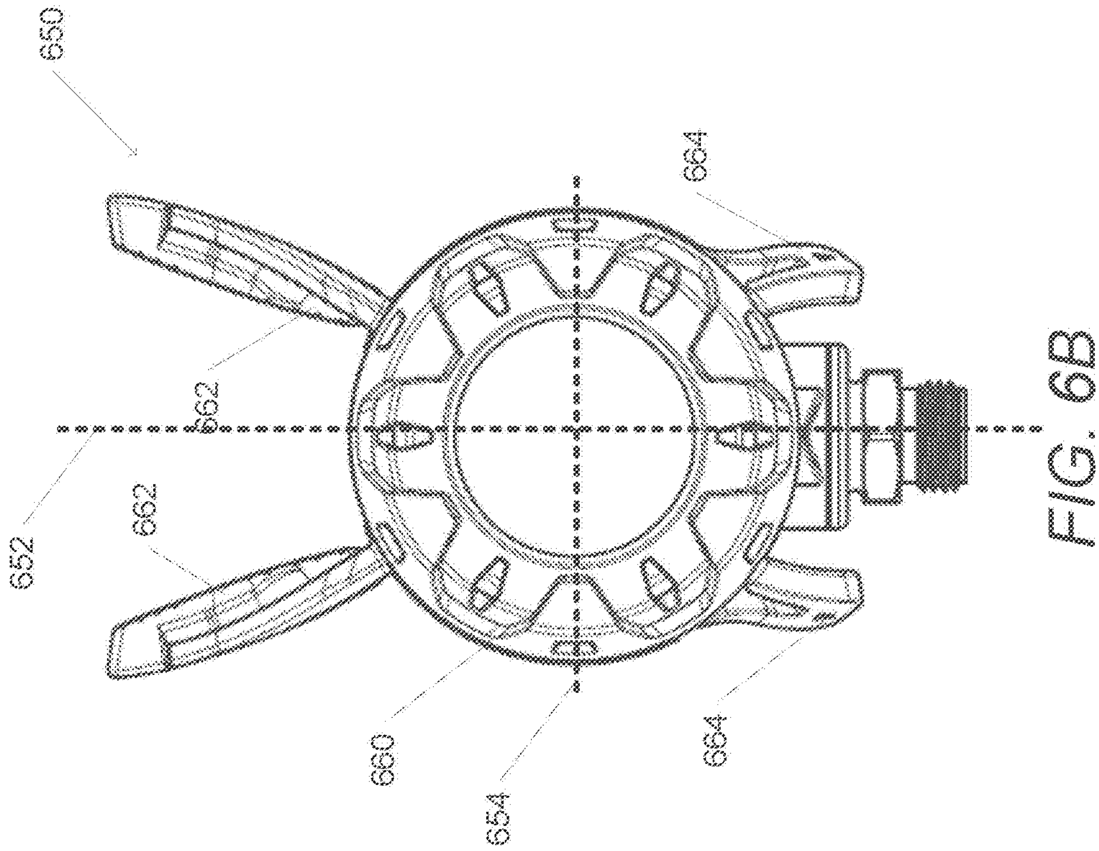
FIGS. 6A-B are line drawings of nosepieces of a second stage regulator in accordance with embodiments of the invention.
Figure 6A:
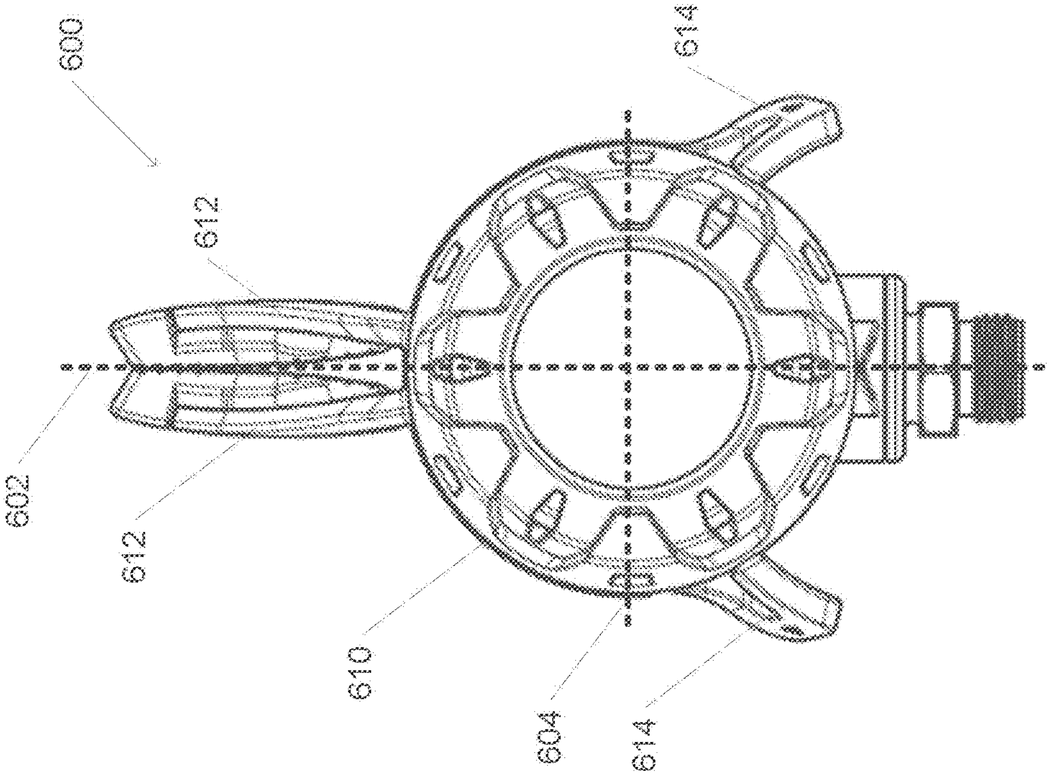

FIGS. 6A-B are line drawings of nosepieces of a second stage regulator in accordance with embodiments of the invention. FIG. 6A shows a second stage regulator 610 with nosepieces 612 in a closed position. In the closed position, the nosepieces 612 are held together via spring tension such that an object located between the nosepieces 612 is squeezed. Levers 614 are spaced away from a vertical centerline 602 of the second stage regulator 610. The levers 614 can be pushed toward the coupler located at the bottom of the second stage regulator 610 to rotate the nosepieces 612 around the second stage regulator 610 and away from each other into an open position. In a variety of embodiments, the levers 614 are placed below a horizontal centerline 604 of the second stage regulator 600. By placing the levers 614 below the horizontal centerline 604, the levers 614 can be easily accessed for one-handed operation.

FIG. 6B shows a second stage regulator 660 with nosepieces 662 in an open position. Here, levers 664 are located close to the coupler located at the bottom of the second stage regulator 660, which causes the nosepieces 662 be spaced apart from each other. When released, the spring tension causes the levers 664 to rotate around the body of the second stage regulator 660 and the nosepieces 662 to move towards each other into the closed position. In several embodiments, the levers 664 are located to the left and right sides of vertical centerline 652 and below horizontal centerline 654. The motion of the levers 664 can be constrained, respectively, to the lower left and lower right quadrants formed by the vertical centerline 652 and horizontal centerline 654.

Although a variety of second stage regulators are shown and described with respect to FIGS. 6A-B, any of a variety of other second stage regulators can be used in accordance with embodiments of the invention.

Emergency Breathing Systems

Figure 7A:
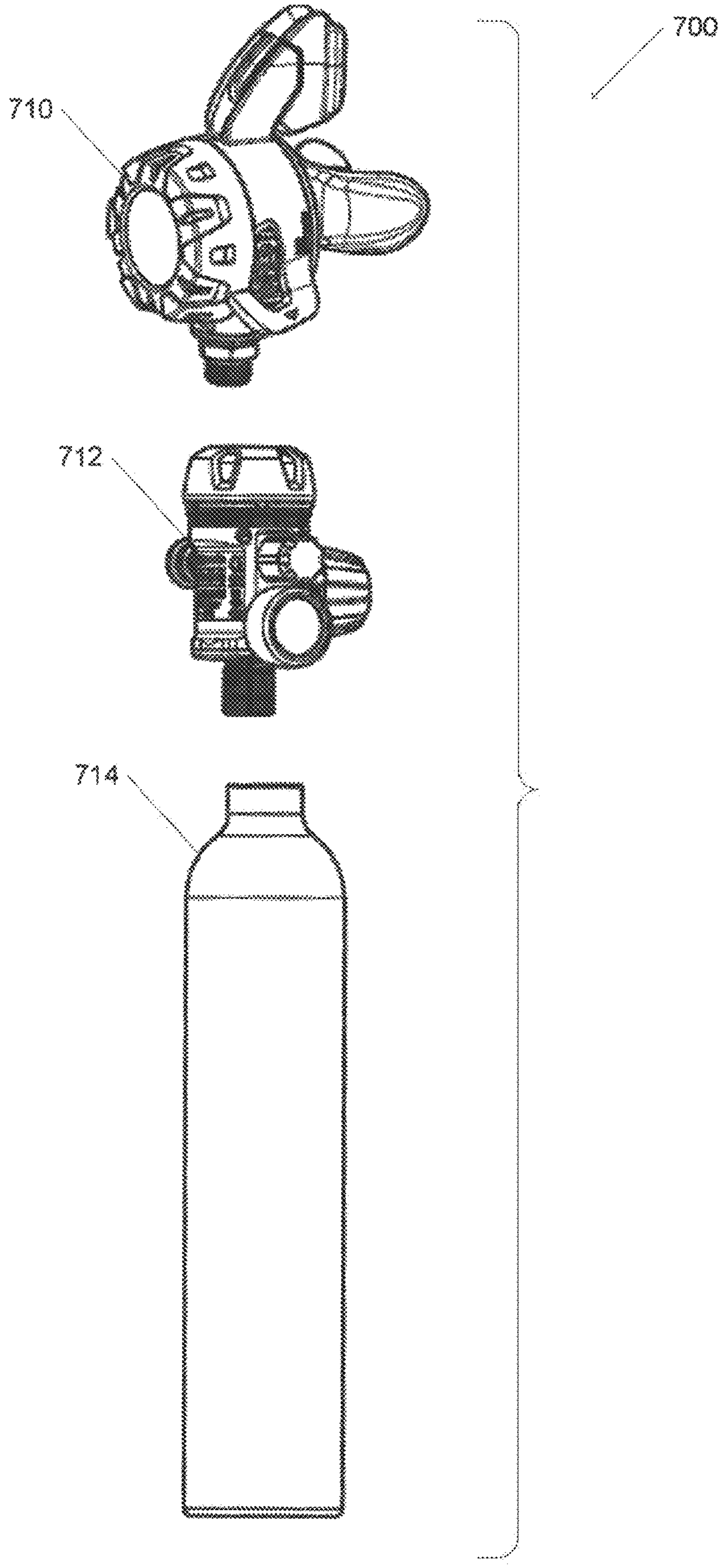
FIGS. 7A-B are illustrations of emergency breathing systems in accordance with embodiments of the invention.
Figure 7B:
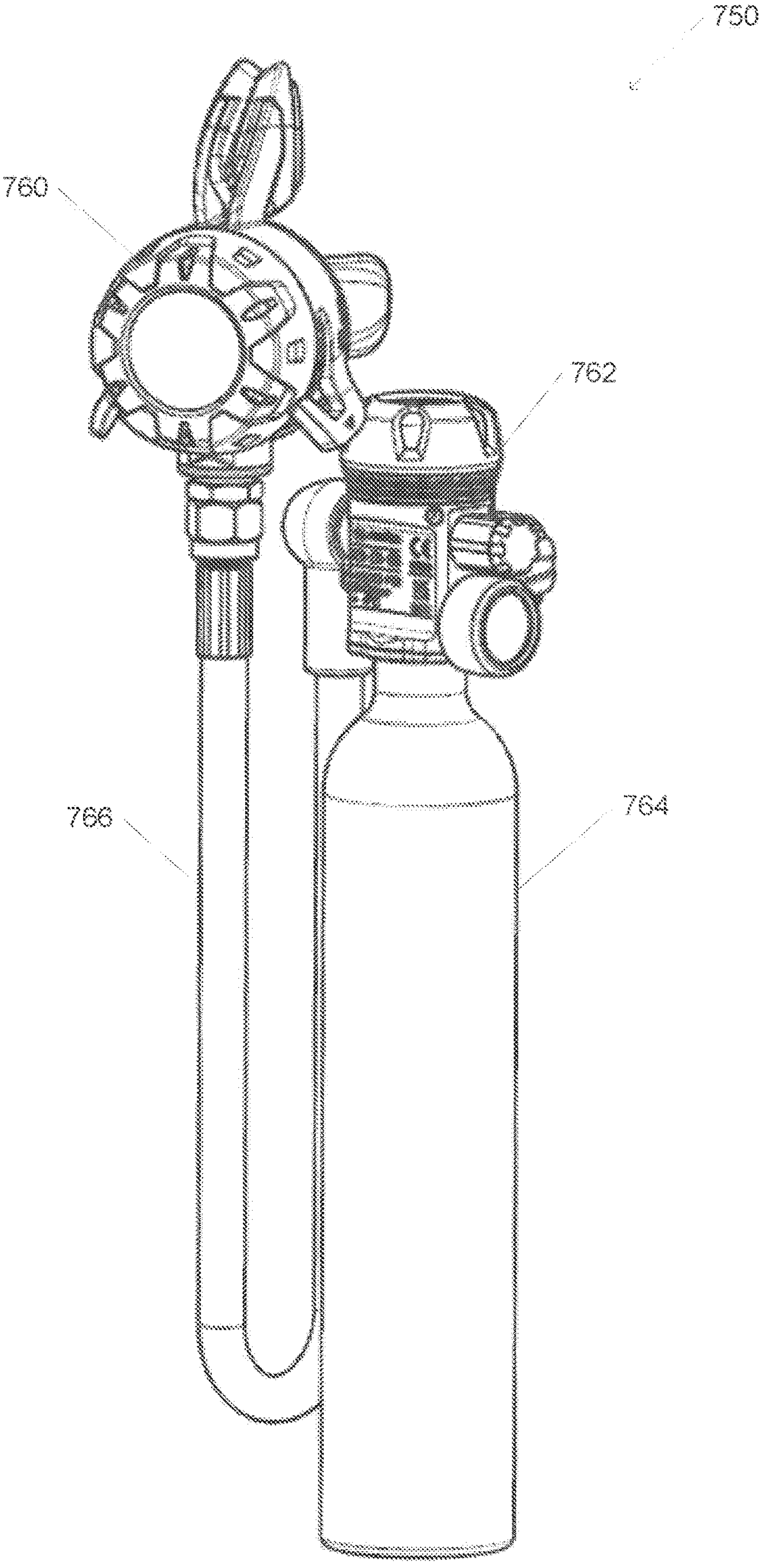

FIGS. 7A-B are illustrations of emergency breathing systems in accordance with embodiments of the invention. FIG. 7A shows the elements of an emergency breathing system, including second stage regulator 710, first stage regulator 712, and air tank 714. The second stage regulator 710 can be coupled to the first stage regulator 712, which in turn is coupled to the air tank 714. Any couplers are described herein can be used, and different couplers can be used on different elements. The air tank 714 stores air (e.g. a breathing mix) that can be used by a user to breath underwater. The breathing mix stored in the air tank 714 is typically stored at a working pressure, such as between approximately 3000 and 4500 PSI. The first stage regulator 712 can be used to control the flow of and regulate the pressure of the breathing mix coming from the air tank 714. In this way, the first stage regulator 712 can both turn on and off the flow of the breathing mix along with stepping down the air pressure to a level appropriate for a user to breathe while underwater, such as 140 PSI. However, it should be noted that any pressures can be used as appropriate to the requirements of specific applications of embodiments of the invention. In several embodiments, the first stage regulator 712 is an unbalanced piston regulator and the second stage regulator 710 is a balanced regulator. In a variety of embodiments, one or more of the second stage regulator 710, first stage regulator 712, and air tank 714 have a pressure gauge indicating the pressure of the breathing mix stored in the air tank 714. In a number of embodiments, the air tank 714 is constructed from steel, aluminum, composite, and/or any other material as appropriate to the requirements of specific applications of embodiments of the invention.

FIG. 7B shows an emergency breathing system 750 in accordance with an embodiment of the invention. The emergency breathing system 750 can be pre-assembled and/or assembled by a user in the event of a crash. Once assembled, the mouthpiece of the second stage regulator 760 can be placed in the mouth of the user while the user depresses the levers to open the nose clips. Once the mouthpiece is inserted, the user can release the levers to secure the nosepieces against the user's nose, thereby closing the user's nose. The user can then inhale through their mouth to breathe the breathing mix stored in the air tank 764. The user can exhale through their mouth to exhaust their breath through the exhaust ports of the second stage regulator 760. The user can also eject spit or other water via the purge valve of the second stage regulator 760. In this way, the water and/or exhaled breath from the user does not flow into the first stage regulator 762 or air tank 764. The second stage regulator 760 can be coupled to the first stage regulator 762 via a hose 766. This arrangement allows the air tank 764 and first stage regulator 762 assembly to be located securely on a person, such as on a life vest while the second stage regulator 760 is located in the user's mouth.

As described herein, a variety of couplers can be used to couple the components of an emergency breathing system. For example, the first stage regulator 762 can include a threaded coupler and screw directly onto the air tank 764. The hose 766 can include a coupler on each end, with a first end coupling to the first stage regulator 762 and the second end coupling to the second stage regulator 760. In a variety of embodiments, the second stage regulator 760 and the second end of the hose 766 each have a swivel coupler, thereby allowing the hose 766 to rotate with respect to the second stage regulator 760. In many embodiments, the first stage regulator 762 and the first end of the hose 766 each have a swivel coupler, thereby allowing the hose 766 to rotate with respect to the first stage regulator 762. In a number of embodiments, the second stage regulator 760 and the second end of the hose 766 each have a threaded coupler and the hose 766 is screwed onto the second stage regulator 760. In several embodiments, the first stage regulator 762 and the first end of the hose 766 each have a threaded coupler and the hose 766 is screwed onto the first stage regulator 762. In this way, couplers can be mixed and matched across the various components of the emergency breathing system 750.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the annotator skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A second stage regulator, comprising:

a housing;

a first nosepiece coupled to a first lever;

a second nosepiece coupled to a second lever;

wherein the first nosepiece coupled to the first lever and the second nosepiece coupled to the second lever are placed circumferential to the housing;

a first spring located in the housing and coupled to the first nosepiece and the first lever;

a second spring located in the housing and coupled to the second nosepiece; and the second lever;

a mouthpiece; and a coupler coupled to the housing;

wherein the first spring and the second spring bias the first nosepiece and the second nosepiece towards each other;

wherein the first nosepiece and the first lever rotate about a circumference of the housing to an open position when an actuation force is applied to the first lever.

2. The second stage regulator of claim 1, wherein the first nosepiece and the second nosepiece comprise a removable nose pad.

3. The second stage regulator of claim 1, wherein the coupler comprises a threaded coupler.

4. The second stage regulator of claim 1, wherein the coupler comprises a swivel coupler.

5. The second stage regulator of claim 1, wherein the coupler is coupled to a hose.

6. The second stage regulator of claim 1, wherein the coupler is coupled to an air tank forming a pathway for passing a breathing mix stored in the air tank to a user.

7. The second stage regulator of claim 1, wherein the housing further comprises at least one exhaust port allowing exhaled air to leave the second stage regulator.

8. The second stage regulator of claim 7, wherein the housing further comprises a check valve preventing exhaled air from entering a pathway allowing a user to inhale a breathing mix.

9. The second stage regulator of claim 7, wherein the exhaust port is located in an exhaust cover coupled to the housing.

10. The second stage regulator of claim 1, wherein the first nosepiece and the first lever are formed in a unitary component.

11. The second stage regulator of claim 1, wherein the housing comprises a front cover coupled to the housing, the front cover engages with a portion of the first nosepiece, the first lever, the second nosepiece, and the second lever to maintain the first nosepiece, the first lever, the second nosepiece, and the second lever in engagement with the housing.

12. The second stage regulator of claim 1, wherein the first spring is located in a first spring seat formed in the housing and the second spring is located in a second spring seat in the housing.

13. The second stage regulator of claim 1, wherein the second nosepiece and the second lever rotate about a circumference of the housing to an open position independently of the first nosepiece and the first lever when an actuation force is applied to the second lever.

14. The second stage regulator of claim 1, wherein the first lever and the second lever are each located below a horizontal centerline of the housing.

15. An emergency breathing system, comprising:

an air tank; and a second stage regulator coupled to the air tank, the second stage regulator comprising a housing, a first nosepiece coupled to a first lever, a second nosepiece coupled to a second lever, wherein the first nosepiece coupled to the first lever and the second nosepiece coupled to the second lever are placed circumferential to the housing, a first spring located in the housing and coupled to the first nosepiece and the first lever, and a second spring located in the housing and coupled to the second nosepiece and the second lever, where the first spring and the second spring bias the first nosepiece and the second nosepiece towards each other, wherein the first nosepiece and the first lever rotate about a circumference of the housing to an open position when an actuation force is applied to the first lever; and.

16. The emergency breathing system of claim 15, further comprising a first stage regulator coupled to the air tank, wherein the second stage regulator is coupled to the first stage regulator.

17. The emergency breathing system of claim 16, further comprising a hose coupled to the first stage regulator, wherein the hose is coupled to the second stage regulator.

18. A second stage regulator, comprising:

a housing;

a first nosepiece coupled to a first lever, wherein the first lever is located below a horizontal centerline of the housing;

a second nosepiece coupled to a second lever, wherein the second lever is located below a horizontal centerline of the housing;

a first spring located in the housing and coupled to the first nosepiece and the first lever;

a second spring located in the housing and coupled to the second nosepiece; and the second lever;

a mouthpiece; and a coupler coupled to the housing;

wherein the first spring and the second spring bias the first nosepiece and the second nosepiece towards each other;

wherein the first nosepiece and the first lever rotate about a circumference of the housing to an open position when an actuation force is applied to the first lever.

19. The second stage regulator of claim 18, wherein the exhaust port is located in an exhaust cover coupled to the housing.

20. The second stage regulator of claim 18, wherein the first nosepiece and the first lever are formed in a unitary component.

21. The second stage regulator of claim 18, wherein the housing comprises a front cover coupled to the housing, the front cover engages with a portion of the first nosepiece, the first lever, the second nosepiece, and the second lever to maintain the first nosepiece, the first lever, the second nosepiece, and the second lever in engagement with the housing.

* * * * *